S. S. STACNECK.
PICKER CHECK.
APPLICATION FILED NOV. 16, 1912.
1,083,868.
Patented Jan. 6, 1914.
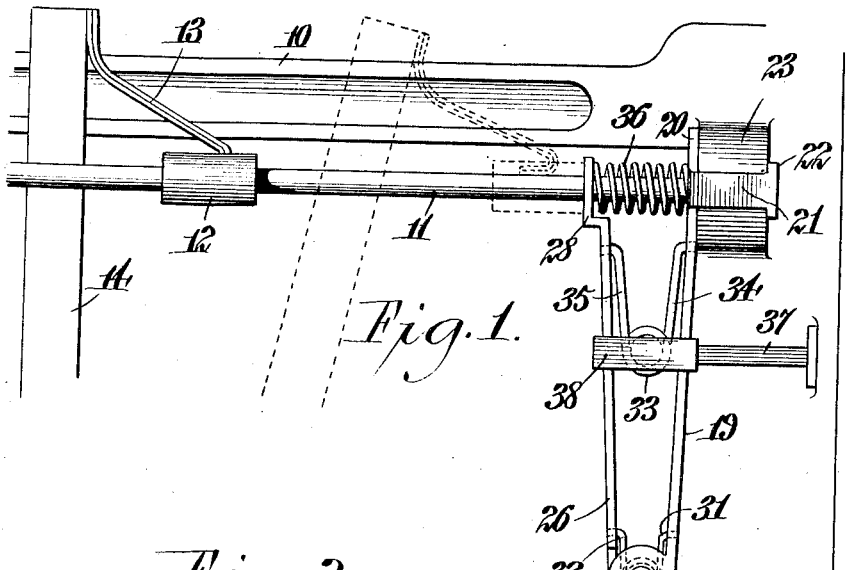
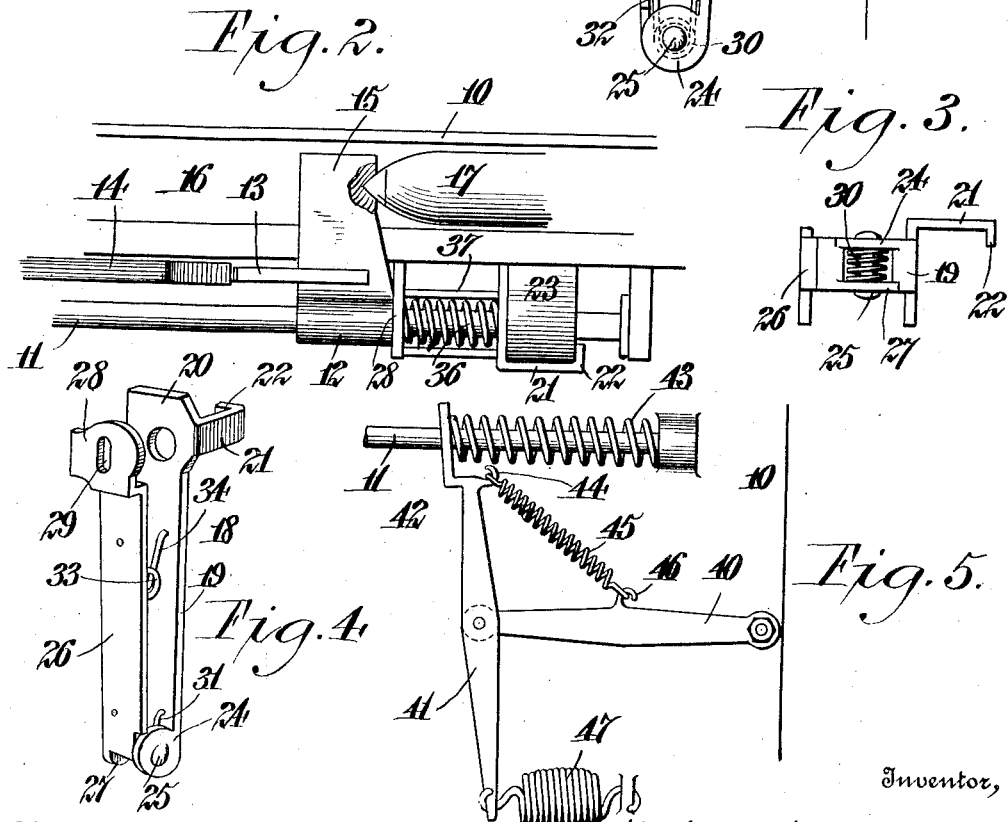
Witnesses:
Christ Feinle, Jr.
F. H. Hostler
Inventor,
Stevens S. Stacneck.
By Victor J. Evans,
Attorney.

UNITED STATES PATENT OFFICE.

STEVENS S. STACNECK, OF GILBERTVILLE, MASSACHUSETTS.

PICKER-CHECK.

1,083,868.  Specification of Letters Patent.  Patented Jan. 6, 1914.

Application filed November 16, 1912. Serial No. 731,734.

*To all whom it may concern:*

Be it known that I, STEVENS S. STACNECK, a citizen of the United States, residing at Gilbertville, in the county of Worcester and State of Massachusetts, have invented new and useful Improvements in Picker-Checks, of which the following is a specification.

The invention relates to looms and has for an object to provide a device for cushioning the picker after the same has been actuated by the picker stick to discharge the shuttle from the shuttle box.

The invention embodies among other features, various improvements over a patent granted to me Nov. 21, 1911, #1,009,595.

When the picker stick is actuated to advance the picker along the picker rod and throw the shuttle from the shuttle box, the movement of the picker when the same reaches the end of the stroke and has discharged the shuttle from the shuttle box, must be arrested in order that the picker stick, returning to initial position can carry the picker therewith, the movement of the picker rod being very rapid in order that the picker can be actuated to discharge a shuttle from the shuttle box at frequent intervals. Use is, therefore, made of a structure which not only arrests the picker when the same reaches the end of its stroke, but also acts as a cushion for the picker to absorb the shock produced when the picker is advanced to the limit of its stroke by the action of the picker stick.

In the further disclosure of the invention, reference is to be had to the accompanying drawings constituting a part of this specification, in which similar characters of reference denote corresponding parts in all the views, and in which—

Figure 1 is a side elevation of a portion of a loom, showing my device applied thereto, the picker being shown in full lines in position for throwing the shuttle and in dotted lines in final position after throwing the shuttle from the shuttle box. Fig. 2 is a plan view showing the picker in final position with the shuttle almost entirely discharged from the shuttle box, parts being broken away to disclose the underlying structure. Fig. 3 is a bottom plan view of my device. Fig. 4 is a perspective view of the frame and the receiving member. Fig. 5 is a side elevation of a modified form of my device.

Referring to the views and more particularly to Figs. 1, 2, 3, and 4 I provide the usual loom 10 provided with a picker rod 11, a picker 12 being mounted to operate on the rod 11 and connected by a strap 13 to a picker stick 14, the mentioned picker 12 having a head 15 extended from one side thereof and projecting into a shuttle box 16 adapted to contain a shuttle 17, an end of the shuttle 17 being engaged by the head 15 of the picker 12 when the picker stick 14 is actuated to advance the picker 12 along the rod 11 so that the picker 12 in its action will discharge the shuttle 17 from the shuttle box 16.

A frame 18 is provided and consists of an elongated body 19 terminating at the upper end thereof in an apertured head 20, an end of the rod 11 being adapted to extend through the aperture in the head 20, the said head being provided with an integral laterally extending shank 21 terminating in a laterally extending retaining lug 22, a side of the head 20 being positioned to abut against a bearing 23, formed on the loom 10 and having the rod 11 extending therethrough with the shank 21 extending across an edge of the bearing 23 and the retaining lug 22 projecting across a face of the bearing 23 to secure the frame 18 in position at one end of the rod 11. The lower end of the body 19 terminates in an apertured ear 24 through which is passed a bolt 25, a receiving member 26 being provided with an apertured ear 27 through which the bolt 25 is extended to pivotally connect the receiving member 26 with the body 19 of the frame 18, the mentioned receiving member extending upwardly and terminating in an offset head 28 provided with an elongated aperture 29 through which the rod 11 extends, the aperture 29 being elongated for the purpose of permitting the receiving member 26 to swing relatively to the body 19, the head 28 of the receiving member 26 being adapted to directly receive and be engaged by an end of the picker 12 when the picker is advanced along the rod 11 to discharge the shuttle 17 from the shuttle box 16. A torsional spring 30 is mounted to encircle the bolt 25 and has an end 31 thereof extending into an aperture formed in the body 19, adjacent the ear 24, the other end 32 of the torsional spring 30 being arranged to extend in an aperture formed in the receiving member 26 adjacent the ear 27 thereof. In a similar manner a U-shaped spring 33 has an end 34 thereof engaging the body 19 and an end 35 thereof engaging the receiving member 26, the torsional spring 30 being also substantially U-shaped, and the mentioned springs 30 and 33 being arranged between the body 19 and the receiving member 26, the spring 30 being arranged at the lower ends of the body 19 and receiving member 26 and the spring 33 being arranged intermediate the upper and lower ends of the body 19 and receiving member 26.

An expansible helical spring 36 is mounted to encircle the rod 11 and has an end thereof abutting against the head 20 and the other end thereof abutting against the offset head 28. A suitable bracket 37 is secured to the loom 10 and terminates at the forward end in a slotted head 38, through which a portion of my device is mounted to extend, the bracket being provided to aid in supporting the device and retain the same in proper position. Now when the picker is advanced along the rod 11, the same when reaching the end of its stroke will strike the offset head 28 of the receiving member 26 with great force, thus tending to compress the spring 36 together with the U-shaped springs 30 and 33 and as the picker strikes the mentioned head, the forward movement of the picker will be checked without perceptibly jarring or injuring the picker and the shock occasioned by the blow produced when the picker strikes the head 28 is substantially absorbed by the springs 30, 33 and the helical springs 36, the mentioned springs being adapted to return the receiving member and head 28 to initial position after the head has been struck by the picker 12 and swung toward the frame 18, it being readily understood that the return of the receiving member to initial position, after being struck by the picker, must be very rapid in view of the rapid movement of the picker over the rod 11.

In Fig. 5 I disclose a modified form of my device and in which a frame 40 is mounted to swing on the loom 10, a receiving member 41 being mounted to swing on an end of the frame 40 and terminating at the upper end in an offset head 42 provided with an elongated aperture through which the rod 11 extends, an expansible helical spring 43 being mounted to encircle the rod 11 with an end of the spring, abutting against the loom 19 and the other end of the spring abutting against the head 42. A hook 44 is formed on the upper end of the receiving member 41 and connected thereto is a contractile spring 45, an end of the said spring being connected to the frame 40 by passing the end of the spring over a hook 46 formed on the said frame, a contractile helical spring 47 having an end thereof connected to the loom 10 and the other end thereof terminating in a hook for connection with the the lower end of the receiving member 41.

The operation of the modified form of my device is substantially the same as the operation of the preferred form and the picker when advanced along the rod 11 strikes the offset head 42 to compress the spring 43. The spring 45 normally exerts a pull at all times on the receiver 41 to pull the upper end of the receiving member toward the frame 40 and the spring 47 exerts a pull on the receiving member 41 to pull the lower end of the receiving member toward the frame 40, the mentioned springs 45 and 47 being of a relative strength and operable in conjunction with the spring 43 to absorb the shock of the blow that the picker 12 imparts to the head 42 when the picker reaches the end of its stroke to discharge the shuttle 17 from the shuttle box 16.

I claim:—

1. In a picker check, the combination with a frame for attachment to a loom, of a receiving member supported by the frame at its medial portion, a picker rod carried by the frame and having an end of the receiving member slidable thereon, a spring encircling the picker rod and engaged by the upper end of the receiving member, and a plurality of springs having connection with the receiving member at the ends thereof.

2. In a picker check, the combination with a frame for attachment to a loom, of a receiving member having connection with the frame at its medial portion, and a plurality of springs interposed between the sides of the receiving member and engaging the same adjacent the ends thereof.

3. In a picker check, the combination with a frame for attachment to a loom, of a receiving member having its medial portion connected to the frame, a picker rod carried by the frame, a head on the receiving member and encircling the picker rod to slide thereon, a spring abutting against a portion of the receiving member and engaging the head thereof, and a plurality of springs interposed between the sides of the receiving member and engaging the same adjacent the ends thereof.

In testimony whereof I affix my signature in presence of two witnesses.

STEVENS S. STACNECK.

Witnesses:
  ALBERT HALAFAOSKI,
  LEON SMALEN.

---

Copies of this patent may be obtained for five cents each, by addressing the "Commissioner of Patents, Washington, D. C."